(12) United States Patent  (10) Patent No.: US 7,428,949 B2
Algüera et al.  (45) Date of Patent: Sep. 30, 2008

(54) SUPPORT WINCH WITH GREASE SUPPLY

(75) Inventors: Jose Algüera, Aschaffenburg (DE); Gerald Müller, Obertshausen (DE)

(73) Assignee: Jost-Werke GmbH, Neu-Isenburg (DE)

( * ) Notice: Subject to any disclaimer, the term of this patent is extended or adjusted under 35 U.S.C. 154(b) by 629 days.

(21) Appl. No.: 10/654,159

(22) Filed: Sep. 3, 2003

(65) Prior Publication Data

US 2004/0074701 A1 Apr. 22, 2004

(30) Foreign Application Priority Data

Sep. 4, 2002 (DE) ................................ 102 40 824

(51) Int. Cl.
*F16H 57/04* (2006.01)
(52) U.S. Cl. .................... 184/6.12; 383/202; 74/467
(58) Field of Classification Search ............... 184/6.12; 383/202; 74/467
See application file for complete search history.

(56) References Cited

U.S. PATENT DOCUMENTS

| 3,034,695 A | | 5/1962 | Berghgracht |
| 3,451,625 A | * | 6/1969 | Fruktaw ............... 239/265.35 |
| 3,469,655 A | | 9/1969 | Moreno |
| 3,697,196 A | * | 10/1972 | Moisdon ..................... 417/211 |
| 4,000,664 A | | 1/1977 | Christensen |
| 4,913,263 A | | 4/1990 | Spiers |
| 5,271,528 A | | 12/1993 | Chien |
| 5,401,546 A | | 3/1995 | Meattle |
| 5,489,472 A | | 2/1996 | Anderson |

FOREIGN PATENT DOCUMENTS

| DE | 26 02 185 | | 3/1977 |
| DE | 3844110 | | 8/1990 |
| EP | 0 209 362 | | 1/1987 |
| EP | 0 530 662 | | 3/1993 |
| EP | 0 845 396 | | 6/1998 |
| GB | 699778 | | 11/1953 |
| JP | 03051570 A | * | 3/1991 |

* cited by examiner

*Primary Examiner*—Chong H Kim
(74) *Attorney, Agent, or Firm*—Hudak, Shunk & Farine Co. LPA

(57) ABSTRACT

The invention describes an arrangement of lubricating grease inside the housing of a gear unit with rotatable components, particularly the gear unit of a jack. It also describes a grease pouch for receiving lubricating grease and a method for lubricating the gear unit with lubricating grease. Since the gear units are often not transported in their installed position, oil that has separated from the lubricating grease may leak from any gearbox openings. Thus, one of the objects of the invention was to provide an arrangement of lubricating grease in the housing of a gear unit, which on the one hand provides lubrication of the gear unit so that it is ready for operation in its delivery condition and on the other hand effectively prevents the oil separated from the lubricating grease from leaking prior to initial startup. This object is attained by enclosing the lubricating grease within at least one grease pouch prior to initial startup of the gear unit. The at least one grease pouch is inserted into the housing of the gear unit so as to contact the components. Upon initial startup the at least one grease pouch is torn open by the action of the components and releases the lubricating grease.

17 Claims, 2 Drawing Sheets

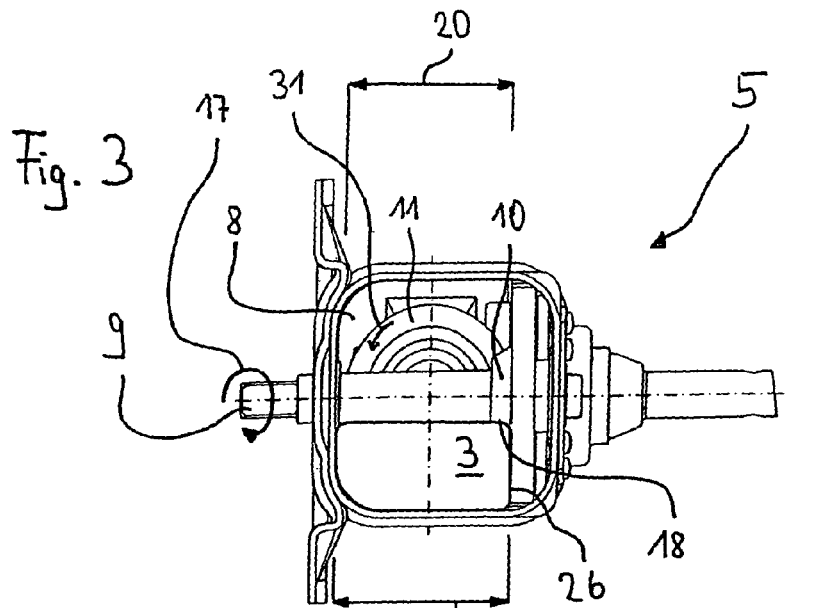
Fig. 3
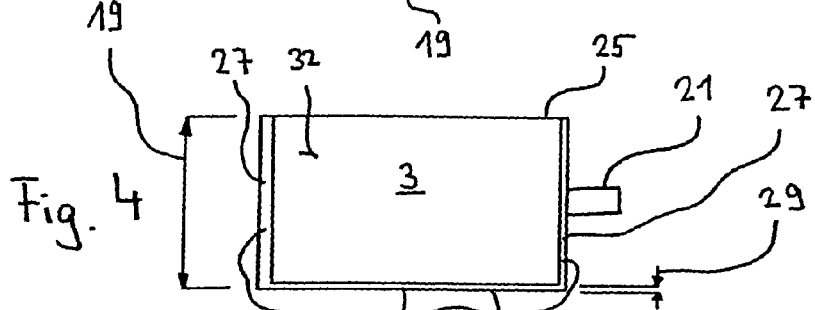
Fig. 4
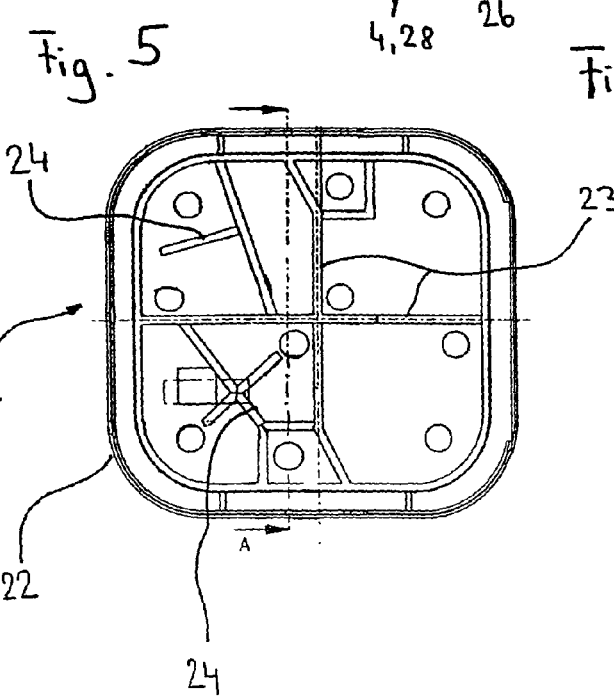
Fig. 5
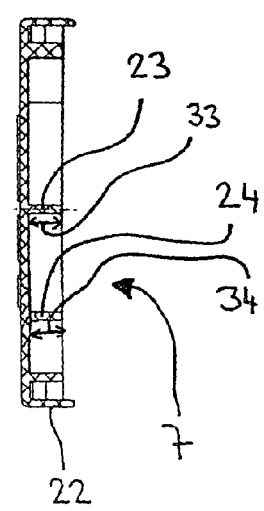
Fig. 6 Cutaway A-A

SUPPORT WINCH WITH GREASE SUPPLY

FIELD OF THE INVENTION

The invention relates to an arrangement of lubricating grease in the housing of a gear unit having rotatable components, particularly the gear unit of a jack. The invention further relates to a grease pouch for receiving lubricating grease and, further, to a method for lubricating gear units with lubricating grease.

BACKGROUND OF THE INVENTION

Gears are commonly lubricated with lubricating grease before delivery and are thus delivered to the customer in a condition ready for use. Because the gears are often not transported in their installed position but, e.g., lying flat, and the lubricating grease releases oil after even a relatively short storage period, this oil may run out of gearbox openings.

This problem occurs, for example, in landing gears that are to be mounted in pairs on semi-trailers of tractor-trailer units. They essentially comprise a support tube with an inner tube that can be telescoped by means of a drive shaft and a gear mechanism.

The major drawback of the leaking oil, in addition to the environmental pollution it causes, is that the oil runs down on the outside of the gearbox and must be removed in a time-consuming process prior to any subsequent paint job. Otherwise it is impossible to obtain a satisfactory painting result.

It has therefore been attempted in the manufacture of the jacks to make the gearbox completely oil-tight to the outside. In practice, however, the results were only partially satisfactory. Although it was possible to obtain a seal in the area of a lid sealing the support tube by introducing a sealing compound between the lid and the support tube and to seal the feed-through of the primary shaft, a solution to the problem of sealing the connecting shaft opening has thus far remained elusive.

SUMMARY OF THE INVENTION

Thus, one of the objects of the invention was to provide a lubricating grease arrangement in a gear housing making it possible on the one hand to provide ready-to-use lubrication of the gearing in its delivery condition and on the other hand effectively to prevent any oil that may have separated from the lubricating grease from leaking prior to initial startup.

A further object was to develop an optimized grease pouch for receiving lubricating grease.

Yet another object was to develop a method for greasing a gear unit making it possible to introduce the lubricating grease prior to delivery and at the same time to prevent the loss of oil that may have separated from the lubricating grease.

According to the invention, these objects are attained by an arrangement in which the lubricating grease is enclosed by at least one grease pouch prior to initial startup of the gear unit. The at least one grease pouch is inserted into the gearbox on at least one rotatable component. Through the action of the rotatable component the at least one grease pouch tears open when the gear unit is initially operated and releases the lubricating grease.

Due to the rotary motion of the rotatable components, e.g. the shafts and the gear wheels, the lubricating grease is uniformly distributed within the gear unit upon initial use.

To ensure that the grease pouch is reliably torn open, at least one edge of the grease pouch is preferably arranged on a gear wheel of the gear unit. As soon as this gear wheel of the gear unit begins to rotate upon initial startup, the entire grease pouch is caught by its edge and pulled into the gear unit. Inside the gear unit, the grease pouch is torn open and the lubricating grease is distributed by the rotating gear parts.

It is advantageous if the grease pouch is under pressure because this facilitates the tearing of the grease pouch. This can be accomplished, for example, by a special configuration, e.g., of a gearbox cover that is equipped with ribs pushing against the grease pouch.

A special embodiment relates to the arrangement of lubricating grease in the gears of a jack. The gears at least partially arranged inside a gear chamber formed by a support tube and a gear cover. It is equipped with a shaft, particularly an intermediate shaft, having a first bevel gear. The first bevel gear meshes with a second bevel gear that is non-rotatably mounted on the gear-side end of a spindle. By rotating the shaft in a first direction of rotation, an inner tube mounted inside the support tube and engaging with the spindle via a spindle nut can be telescoped in an extension direction. The lubricating grease is completely enclosed by a grease pouch. This grease pouch is placed into the gear chamber with at least one edge on the first bevel gear and/or the second bevel gear. Upon initial startup of the jack, the bevel gears start to rotate, catch the edge of the grease pouch and pull the entire grease pouch between the first and the second bevel gear, such that during the first pass of the grease pouch through the bevel gears the lubricating grease is already squeezed out and distributed within the gear unit.

Preferably, the grease pouch is arranged in the gear chamber on a pull-in side of the bevel gears in the first direction of rotation. As a result, the grease pouch does not need to position itself independently but is already inserted in an appropriate position prior to delivery of the jack directly in front of the bevel gears on the pull-in side of the bevel gears. Because the jacks are always delivered in their retracted state, and the customer can therefore move the jack only in the extension direction upon initial startup, the direction of rotation of the bevel gears is likewise predetermined at the time of initial startup, and the pull-in side of the cooperating bevel gears is thus defined.

Advantageously, the width of the grease pouch largely corresponds to the diameter of the second bevel gear.

Preferably, the diameter of the second bevel gear, in turn, corresponds approximately to the inside width of the gear chamber. The width of the grease pouch essentially determines the shape of the pouch for a given amount of lubricating grease. If the width of the grease pouch is clearly greater than the diameter of the second bevel gear, wall friction increases substantially and the grease pouch may not be pulled in at all or only incompletely. On the other hand, if the grease pouch is clearly narrower but has the same length and contains a given minimum amount of lubricating grease, it becomes too full. Again, the bevel gears may not pull it in and destroy it at all or only incompletely. In either case, the gearing will not be adequately supplied with lubricating grease.

Advantageously, the at least one edge of the grease pouch is fixed to at least one bevel gear and/or to the shaft, particularly to an intermediate shaft, by means of an adhesive. This further increases the probability that the grease pouch will be caught and pulled in. A suitable adhesive is, for example, a spray adhesive.

As an alternative or in addition to the use of an adhesive, the edge of the grease pouch may be provided with a mounting tab that can be guided between the intermediate shaft and the second bevel gear.

Preferably, the gear cover is provided with blocking ribs protruding into the interior and acting on the grease pouch.

In jacks of the prior art, the gear cover is frequently configured with a circumferential supporting rim protruding on the underside and with a protruding cross rib. In this connection it may be advantageous to provide additional blocking ribs on the supporting rim and the cross rib. While the cross rib primarily serves to stiffen the gear cover, the function of the blocking ribs, after insertion of the grease pouch, is to push the grease pouch against the components of the gear unit, e.g. the bevel gears, as the gear cover is closed. As a result, the grease pouch can be made smaller and can be filled with less lubricating grease. This, in turn, reduces costs and the amount of grease pouch material to be ground up by the gears.

In addition, the blocking ribs prevent the grease pouch or larger quantities of lubricating grease from getting stuck in the cross rib and thus improve the lubrication of the moving gear parts.

The one further object is attained by a grease pouch made of a composite material. The individual layers of this composite material have different functions. The composite material preferably has an inner polyethylene layer, an aluminum layer applied thereto, an intermediate polyethylene layer and an outer paper layer. The polyethylene layers are necessary to weld the pouch material together along the edges. The aluminum layer ensures that the oil or lubricating grease cannot get through to the outside and thus represents a barrier layer. The paper has a relatively rough surface and is relatively easily caught and torn open by the gearing components.

Preferably, the inner polyethylene layer has a weight per unit area of 20 g/m² to 30 g/m², the aluminum layer has a thickness of 5 µm to 10 µm, the intermediate polyethylene layer has a weight per unit area of 10 g/m² to 15 g/m², and the outer payer layer has a weight per unit area of 20 g/m² to 50 g/m². Such a layer structure of the composite material ensures on the one hand that the lubricating grease is tightly encapsulated and on the other hand scarcely affects the running behavior of the gear unit after release of the lubricating grease. This is apparent, for example, from a change in the energy required to displace the jack, which is not noticeable to the operator of the jack.

The outer shape of the grease pouch can be rectangular with two opposite longitudinal edges and two opposite face edges. If the grease pouch is rectangular, a first longitudinal edge can be made as a folded edge while the opposite second longitudinal edge as well as the face edges can be welded edges. This is a very simple solution in terms of production since only three sides need to be welded despite the rectangular shape. In addition, production tolerances and scrap are reduced because the grease pouch is made of a single piece of material and the topside is less likely to shift relative to the underside when the grease pouch is manufactured.

Advantageously, the width of the welding edge increases by at least one face edge in the direction of the longitudinal edges. This again makes it easier for the grease pouch to be pulled into the gearing because the first bevel gear is often arranged in an edge area of the gearbox and the welded edge interacting with the first bevel gear is wider in this edge area in the above-described embodiment of the grease pouch. To minimize errors during inserting of the grease pouch prior to the delivery of the gear unit, the width of the welded edge should increase symmetrically in the direction of the longitudinal edges.

It has been found to be particularly advantageous if the grease pouch is dimensioned to receive a lubricating grease amount ranging from 160 g to 200 g. This amount of lubricating grease ensures lubrication of the gearing of the jack and at the same time clearly reduces the amount of lubricating grease required as compared to the prior art. This is due to the fact that the lubricating grease is applied directly to the moving components of the gearing and that the filling of cavities within the gear chamber is thereby avoided.

The second further object is attained by a method in which at least one pouch filled with lubricating grease is brought into contact with the gearing prior to startup. Upon startup of the gear unit, at least one component of the gearing tears open the at least one grease pouch so that the lubricating grease is released and lubricates the gearing. After startup, the at least one grease pouch remains in the gearing. The great advantage of this method is that it does not require any structural changes to be made in either the gearing or the support tube surrounding the gearing.

Preferably, the at least one grease pouch disintegrates automatically. In this case, one or more gelatin capsules may be used as grease pouches.

However, the grease pouch is advantageously ground up by the gearing, so that the grease pouch is shredded after the jack has been moved several times, and the ground up parts of the grease pouch remaining in the gearing do not have any negative effects.

BRIEF DESCRIPTION OF THE DRAWINGS

The invention will now be described in greater detail, by way of example, with reference to six drawing figures in which:

FIG. 3 is a top view of an open jack with inserted grease pouch prior to initial startup, FIG. 4 is a top view of a grease pouch, FIG. 5 is a bottom view of a gear cover, and FIG. 6 is a longitudinal section taken along line A-A in FIG. 5.

DETAILED DESCRIPTION OF THE INVENTION

Figure 1:
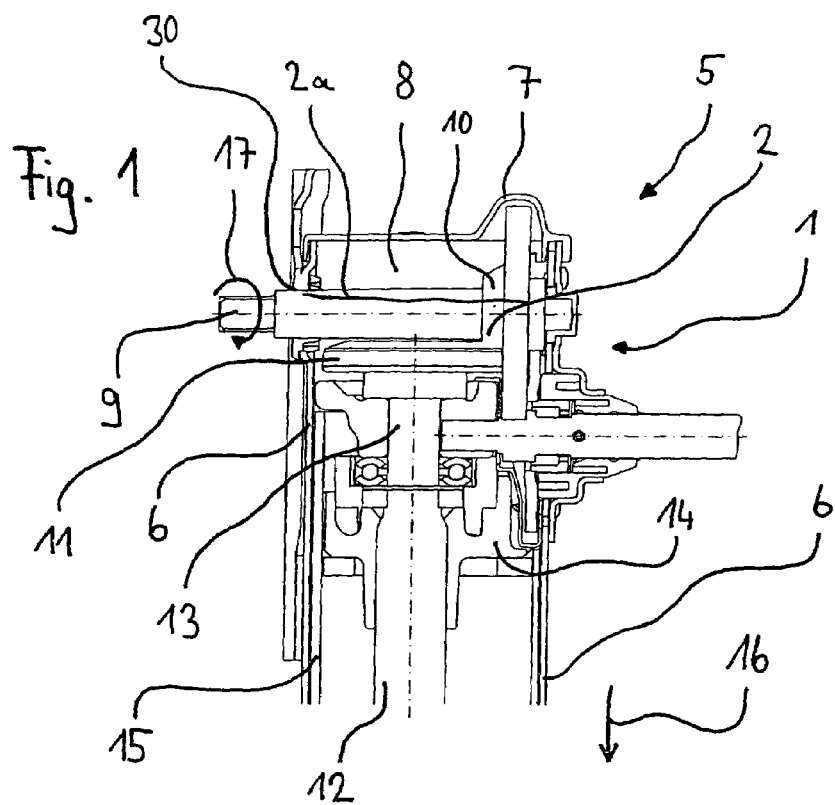
FIG. 1 is a longitudinal section of an upper part of a jack filled with lubricating grease.

FIG. 1 shows a longitudinal section of an upper part of a jack 5 that is conventionally filled with lubricating grease.

The gear unit 1 is arranged within the support tube 6 and drives a spindle 12, which displaces a spindle nut 14 that is fixedly connected with the inner tube 15 in extension direction 16 as the spindle rotates. At the gear-side end 13 of the spindle 12, the spindle 12 is non-rotatably connected with the second bevel gear 11, which in turn cooperates with the first bevel gear 10, which is non-rotatably mounted on the intermediate shaft 9. When the intermediate shaft 9 rotates in a first direction of rotation 17, the inner tube 15 moves in extension direction 16.

To ensure lubrication of the gear unit 1, the gear chamber 8, which is open to the bottom and is formed by the support tube 6 and the gear cover 7, has been filled with lubricating grease 2 up to the filling level 2a. After a separation of oil (not depicted) from the lubricating grease 2, this oil frequently escapes through the shaft feed-through 30 of the intermediate shaft 9, for which a successful seal has not as yet been developed.

Figure 2:
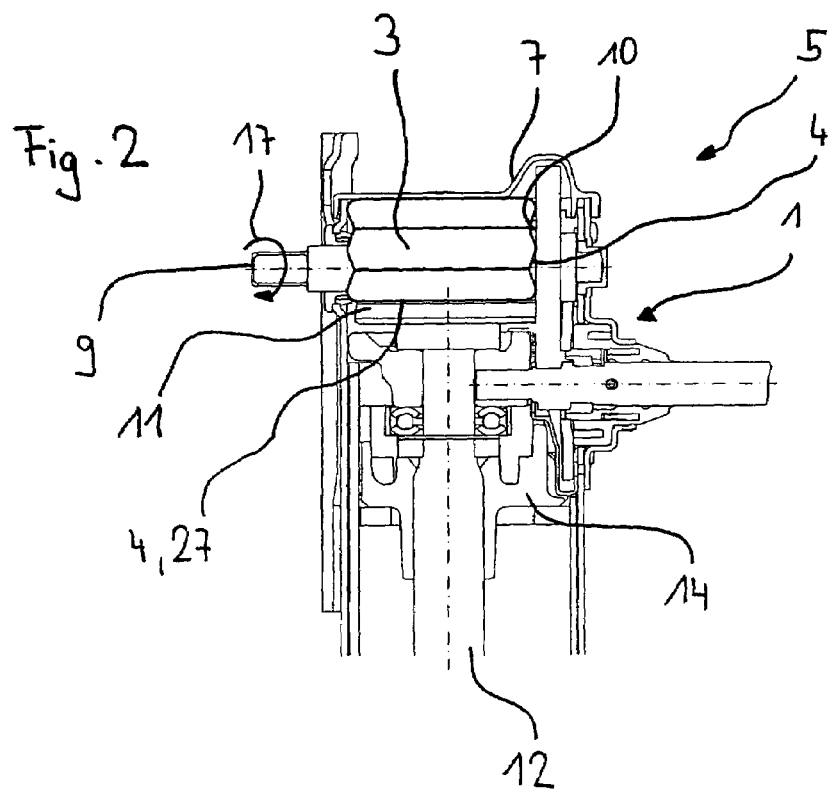
FIG. 2 is a view according to FIG. 1 with inserted grease pouch prior to initial startup.

FIG. 2 shows a view similar to that of FIG. 1 with inserted grease pouch 3 prior to initial startup. Here, the grease pouch 3, with at least one edge 4, particularly the face edge 27, lies fully against the second bevel gear 11 and at the same time contacts the first bevel gear 10, as may be seen in FIG. 3.

FIG. 3 shows the jack 5 in a top view without the gear cover 7, again with inserted grease pouch 3 prior to initial startup. The grease pouch 3 has been inserted on the pull-in side 18 of the bevel gears 10, 11, which in an extension direction 16 (see FIG. 1) is defined by the corresponding first direction of rotation 17 of the intermediate shaft 9.

The top view of FIG. 3 further shows that the width 19 of the grease pouch 3 corresponds approximately to the diameter 20 of the second bevel gear 11 and that the second longitudinal edge 26 lies against the first bevel gear 10 even prior to initial startup.

When the intermediate shaft 9 rotates in a first direction of rotation 17, the face edge 27 (cf. FIG. 4) is caught and pulled in by the intermediate shaft 9 and the second bevel gear 11 or, in a first phase, by the first bevel gear 10.

In a subsequent phase, the first bevel gear 10 engages primarily with the second longitudinal edge 26 of the grease pouch 3, while the second bevel gear 11 rotating in a direction of rotation 31 transports the grease pouch 3, which is now partially open and squeezed out, on the pull-in side 18 in the direction of the first bevel gear 10.

In a final phase, the grease pouch 3 is pulled through completely between the first and the second bevel gear 10, 11 and is largely destroyed in subsequent rotations.

FIG. 4 is a top view of the grease pouch 3, which has a first longitudinal edge 25 configured as a folded edge and an opposite, second longitudinal edge 26 made as a welded edge 28. The two face edges 27 are likewise made as welded edges 28, with a mounting tab 21 being fixed to one face edge 27. The mounting tab 21 can already be inserted between the intermediate shaft 9 and the second bevel gear 11 during assembly and is preferably glued to the intermediate shaft 9 by means of a spray adhesive.

On the welded edges 28, corresponding to the width 29, the topside 32 and the underside (non depicted) of the grease pouch 3 are joined together in a material-based coupling. Due to the flat configuration of the welded edge 28, the gear teeth of the bevel gears 10, 11 engage with this edge 28 particularly effectively.

FIG. 5 is a bottom view of the gear cover 7 with a supporting rim 22 and a cross rib 23, which serves to increase stability. To prevent the grease pouch 3 from getting stuck on the underside of the gear cover 7 between the cross rib 23 and the supporting rim 22, additional blocking ribs 24 are formed.

The height 34 of the blocking ribs 24 corresponds to the height 33 of the cross rib 23, as may be seen in the longitudinal section taken along line A-A of the gear cover 7 in FIG. 6.

LIST OF REFERENCE NUMERALS

1 gear unit
2 lubricating grease
2a filling height of lubricating grease
3 grease pouch
4 edge
5 jack
6 support tube
7 gear cover
8 gear chamber
9 intermediate shaft
10 first bevel gear
11 second bevel gear
12 spindle
13 gear-side end of spindle
14 spindle nut
15 inner tube
16 extension direction
17 first direction of rotation
18 pull-in side of the bevel gears
19 width of grease pouch
20 diameter of second bevel gear
21 mounting tab
22 supporting rim of gear cover
23 cross rib
24 blocking ribs
25 first longitudinal edge
26 second longitudinal edge
27 face edge
28 welded edge
29 width of welded edge
30 shaft feed-through of intermediate shaft
31 direction of rotation of second bevel gear
32 topside of grease pouch
33 height of cross rib
34 height of blocking rib

The invention claimed is:

1. An apparatus having an arrangement of lubricating grease inside the housing of a gear unit, comprising: the gear unit having rotatable components, wherein, prior to the initial startup of the gear unit, the lubricating grease is enclosed by at least one grease pouch, wherein the at least one grease pouch is arranged in the housing of the gear unit wherein at least one face edge of the grease pouch lies in contact with at least a gear wheel of the rotatable component, wherein the lubricating grease is located in the gear unit of a jack, wherein the gear unit is at least partially arranged inside a gear chamber formed by a support tube and a gear cover, has a shaft configured with a first bevel gear, wherein the first bevel gear meshes with a second bevel gear that is non-rotatably mounted on the gear-side end of a spindle, and an inner tube supported in the support tube and engaging with the spindle via a spindle nut can be telescoped in an extension direction by a rotation of the shaft in a first direction of rotation, and wherein the grease pouch is inserted into the gear chamber with at least one edge on the first bevel gear or the second bevel gear or both the first bevel gear and second bevel gear.

2. An apparatus as claimed in claim 1, wherein the grease pouch is arranged in the gear chamber on a pull-in side of the bevel gears in the first direction of rotation.

3. An apparatus as claimed in claim 1, wherein the grease pouch has a width that largely corresponds to the diameter of the second bevel gear.

4. An apparatus as claimed in claim 1, wherein the at least one edge of the grease pouch is attached to at least one bevel gear or the intermediate shaft or both the bevel gear and intermediate shaft by means of an adhesive.

5. An apparatus as claimed in claim 1, wherein the edge of the grease pouch has a mounting tab that can be guided between the intermediate shaft and the second bevel gear.

6. An apparatus as claimed in claim 1, in which the gear cover on its underside has a protruding circumferential supporting rim and a protruding cross rib, wherein additional blocking ribs engage with the supporting rim and the cross rib.

7. An apparatus as claimed in claim 1, wherein the grease pouch is made of a composite material.

8. An apparatus having an arrangement of lubricating grease inside the housing of a gear unit comprising: the gear unit having rotatable components, wherein, prior to the initial startup of the gear unit, the lubricating grease is enclosed by at least one grease pouch, the at least one grease pouch is inserted into the housing of the gear unit so as to lie with at least one edge close to at least a gear wheel of the rotatable component, and the at least one grease pouch is caught by at least one edge and is pulled entirely into the gear unit and tears open during the initial startup because of the action of the rotatable components and releases the lubricating grease, wherein the lubricating grease is located in the gear unit of a jack, wherein the gear unit is at least partially arranged inside a gear chamber formed by a support tube and a gear cover, has a shaft configured with a first bevel gear, wherein the first bevel year meshes with a second bevel gear that is non-rotatably mounted on the gear-side end of a spindle, and an inner tube supported in the support tube and engaging with the spindle via a spindle nut can be telescoped in an extension direction by a rotation of the shaft in a first direction of rotation, and wherein the grease pouch is inserted into the gear chamber with at least one edge on the first bevel gear or the second bevel gear or both the first bevel gear and the second bevel gear.

9. An apparatus as claimed in claim 8, wherein at least one edge of the grease pouch is arranged on a gear wheel of the gear unit.

10. An apparatus as claimed in claim 8, wherein the grease pouch is arranged in the gear chamber on a pull-in side of the bevel gears in the first direction of rotation.

11. An apparatus as claimed in claim 10, wherein the grease pouch has a width that largely corresponds to the diameter of the second bevel gear.

12. An apparatus as claimed in claim 11, wherein the at least one edge of the grease pouch is attached to at least one bevel gear or the intermediate shaft or both the bevel gear and the intermediate shaft by means of an adhesive.

13. An apparatus as claimed in claim 12, wherein the edge of the grease pouch has a mounting tab that can be guided between the intermediate shaft and the second bevel gear.

14. An apparatus as claimed in claim 13, in which the gear cover on its underside has a protruding circumferential supporting rim and a protruding cross rib, wherein additional blocking ribs engage with the supporting rim and the cross rib.

15. An apparatus as claimed in claim 14, wherein the grease pouch is made of a composite material.

16. An apparatus as claimed in claim 8, wherein the grease pouch is arranged in the gear chamber on a pull-in side of the bevel gears in the first direction of rotation, wherein the grease pouch has a width that largely corresponds to the diameter of the second bevel gear, and wherein the at least one edge of the grease pouch is attached to at least one bevel gear and/or the intermediate shaft by means of an adhesive 17. An apparatus as claimed in claim 8, wherein the edge of the grease pouch has a mounting tab that can be guided between the intermediate shaft and the second bevel gear, wherein the gear cover on its underside has a protruding circumferential supporting rim and a protruding cross rib, wherein additional blocking ribs engage with the supporting rim and the cross rib, and wherein the grease pouch is made of a composite material.

* * * * *